United States Patent [19]

Iwata et al.

[11] Patent Number: 4,805,718
[45] Date of Patent: Feb. 21, 1989

[54] POWER TRANSMISSION SYSTEM FOR A FOUR-WHEEL DRIVE

[75] Inventors: Seiichi Iwata; Kyoji Takenaka, both of Tokyo, Japan

[73] Assignee: Fuji Jukogyo Kabushiki Kaisha, Tokyo, Japan

[21] Appl. No.: 892,523

[22] Filed: Aug. 1, 1986

[30] Foreign Application Priority Data

Aug. 5, 1985 [JP] Japan .................. 60-172138

[51] Int. Cl.$^4$ ............................. B60K 17/34
[52] U.S. Cl. .................. 180/233; 180/247; 192/46; 192/48.92; 192/51
[58] Field of Search .............. 180/233, 247, 249, 250, 180/23, 236, 248; 192/51, 50, 48.92, 48.1, 46, 43.1, 43, 47; 364/424.1

[56] References Cited

U.S. PATENT DOCUMENTS

| | | | |
|---|---|---|---|
| 1,621,211 | 3/1927 | Lewis | 180/236 |
| 1,635,236 | 7/1927 | Tolson | 180/247 |
| 2,851,115 | 9/1958 | Buckendale | 180/248 X |
| 4,054,065 | 10/1977 | Lemon | 192/48.1 X |
| 4,552,241 | 11/1985 | Suzuki | 180/197 X |
| 4,586,592 | 5/1986 | Mori | 180/247 X |
| 4,699,237 | 10/1987 | Matsumoto | 180/250 |

FOREIGN PATENT DOCUMENTS

| | | | |
|---|---|---|---|
| 58-136829 | 9/1983 | Japan . | |
| 708581 | 5/1954 | United Kingdom . | |
| 2163107 | 2/1986 | United Kingdom | 180/249 |
| 214757 | 3/1987 | European Pat. Off. | 180/249 |

Primary Examiner—David M. Mitchell
Assistant Examiner—Mitchell J. Hill
Attorney, Agent, or Firm—Martin A. Farber

[57] ABSTRACT

A power transmission system for a four-wheel drive vehicle has front and rear wheel driving power transmission systems for transmitting the output of a transmission. A forward overrunning clutch and a reverse overrunning clutch are provided in one of the power transmission systems. One of the overrunning clutches can be selected in accordance with the operation of a driver of the vehicle. The overrunning clutch operates to transmit the power to corresponding wheels and to allow the selected wheels to rotate faster than the other wheels. A locking device is provided for locking both overrunning clutches.

11 Claims, 4 Drawing Sheets

POWER TRANSMISSION SYSTEM FOR A FOUR-WHEEL DRIVE

BACKGROUND OF THE INVENTION

The present invention relates to a power transmission system for a full-time four-wheel drive vehicle having a mechanism for absorbing the difference between the speeds of the front and rear wheels.

In a part-time four-wheel drive vehicle, the power transmission system can be selectively converted from the two-wheel driving mode to the four-wheel driving mode by engaging a clutch which is manually operated by a select lever.

The two-wheel drive is selected on paved dry surfaces. The reason is as follows. When the vehicle negotiates corners, the front wheels run through an arc of greater radius than that of the rear wheels and therefore tend to rotate faster than the rear wheels. Such a difference between the speeds the of the front and rear wheels causes the braking of the vehicle, known as "tight corner braking". In order to prevent such a braking phenomenon, a full-time four-wheel drive vehicle, a transmission system of which is automatically changed to a two-wheel drive transmission system at a large steering angle, is disclosed in Japanese patent Laid Open No. 57-15019.

Further, Japanese Utility Model Laid Open No. 58-136829 discloses a full-time four-wheel drive tractor having a transmission system in which a one-way clutch (overrunning clutch) is provided in the power transmission for the front wheels. In a normal driving state, the one-way clutch does not engage, thereby establishing the two-wheel driving mode by the rear wheels. When the rear wheels skid, the one-way clutch engages to provide the four-wheel driving mode. However, the system can not prevent the tight corner braking at sharp corners, since the front wheels run faster than the rear wheels, thereby engaging the clutch.

SUMMARY OF THE INVENTION

The object of the present invention is to provide a power transmission system for a full-time four-wheel drive vehicle, which prevents the tight corner braking at corners by providing a double overrunning clutch system, and to provide a system for locking the double overrunning clutch so as to prevent skidding of the wheels.

According to the present invention, there is provided a power transmission system for a four-wheel drive vehicle having a transmission, comprising, first and second power transmission systems for transmitting the output of the transmission to front and rear wheels respectively, a forward overrunning clutch and a reverse overrunning clutch provided in one of the power transmission systems and effective for forward drive and reverse drive respectively, a selecting device for selecting one of the clutches in order to transmit the output of the transmission to corresponding wheels through the selected overrunning clutches. A lock device is provided for locking the forward and reverse overrunning clutches.

In an aspect of the invention, each of the forward and reverse overrunning clutches comprises an outer race operatively connected to a drive shaft of the transmission and rollers disposed between the outer race and a driven shaft.

The other objects and features of this invention will become understood from the following description with reference to the accompanying drawings.

DETAILED DESCRIPTION OF THE PREFERRED EMBODIMENT

Figure 1A:
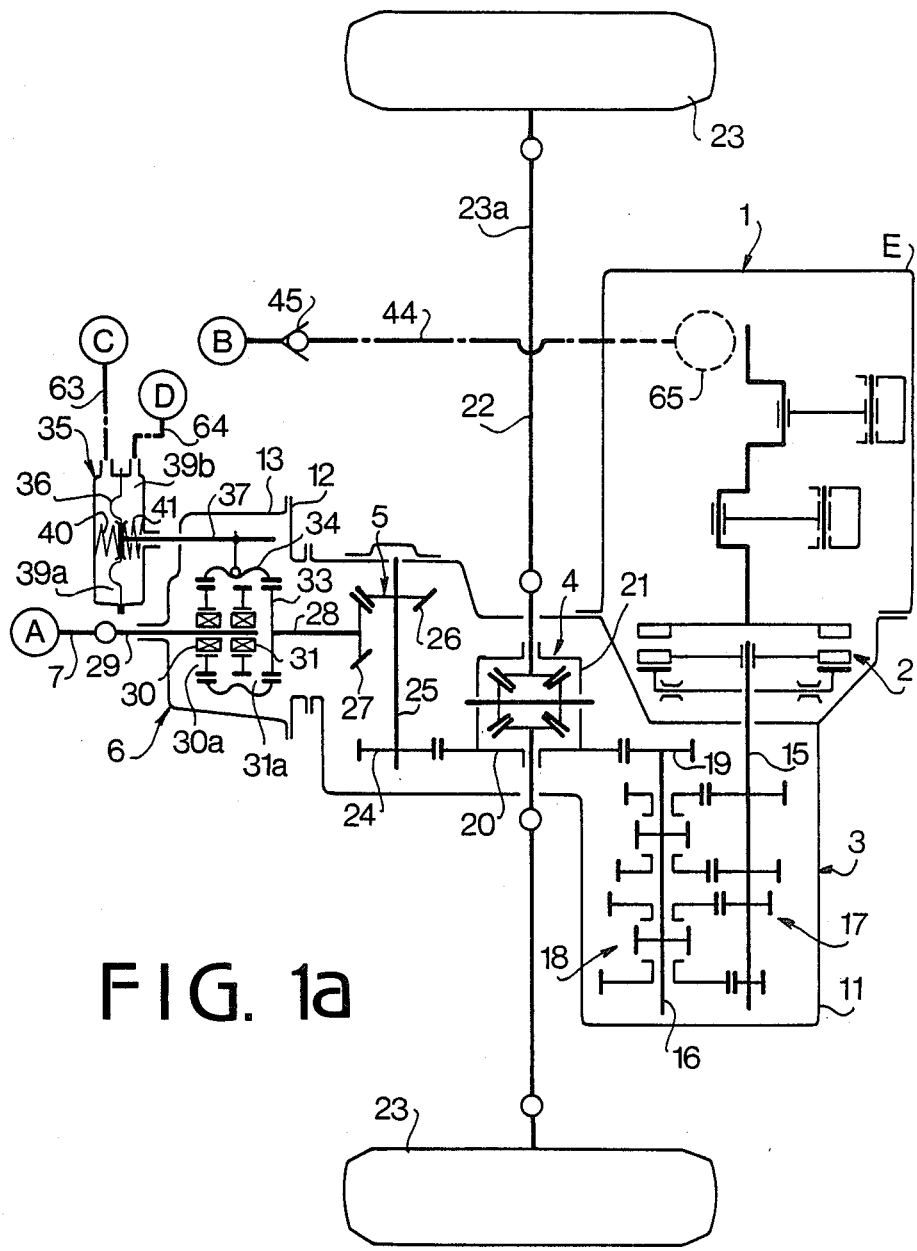
FIGS. 1a and 1b show a schematic illustration showing a power transmission system according to the present invention.
Figure 1B:
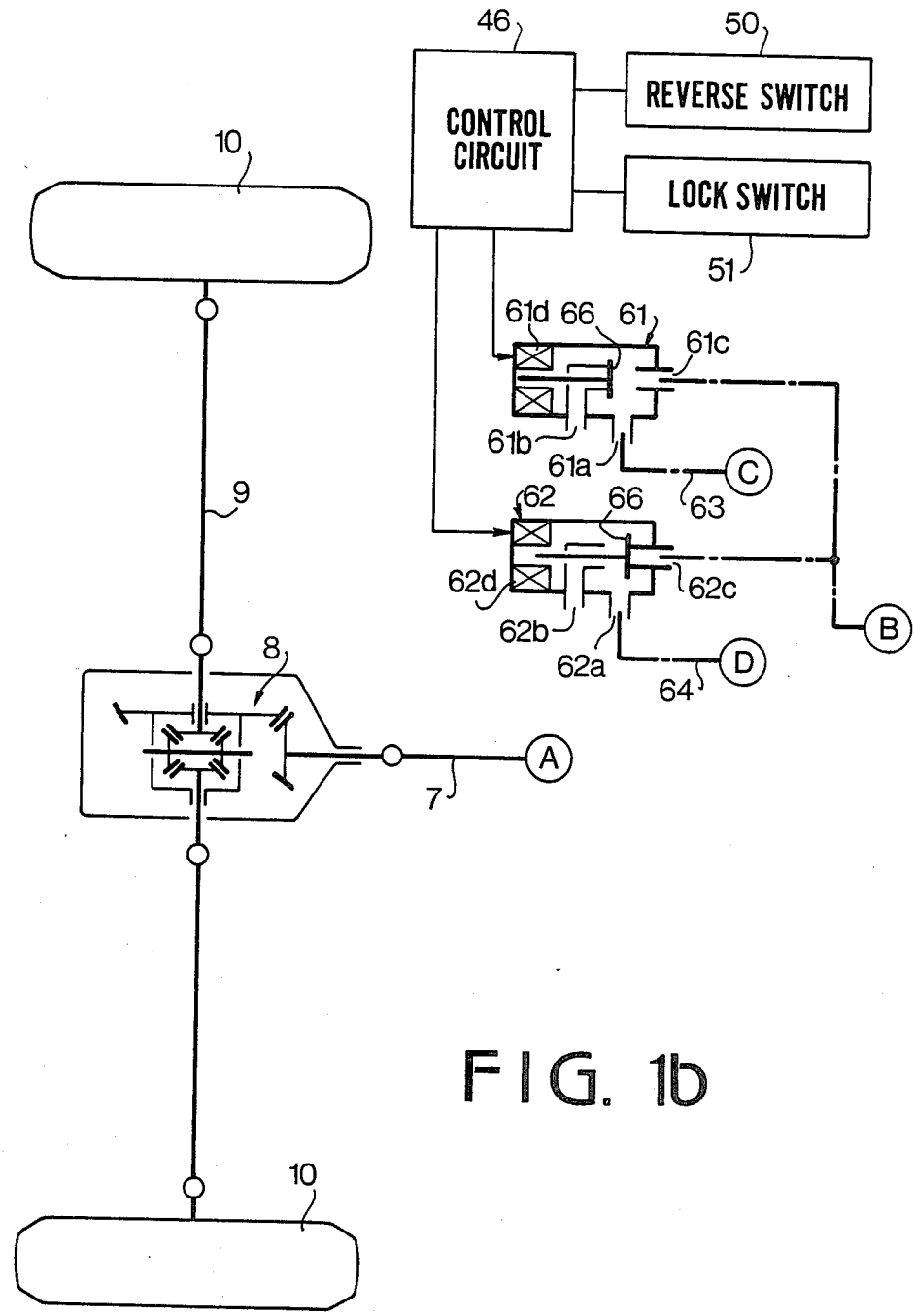

Referring to FIGS. 1a and 1b, an engine unit E is transversely mounted on a rear portion of a vehicle. The engine unit has an engine 1, clutch 2 and transmission 3. The output of the transmission 3 is transmitted to rear wheels 23 of the vehicle through a differential 4 and axles 23a. The output of the transmission 3 is also transmitted to front wheels 10 of the vehicle through a front wheel driving power transmission system comprising a transfer device 5, double overrunning clutch 6, propeller shaft 7, differential 8, and axles 9. A case 13 of the clutch 6 is secured to a case 11 of the transmission 3 through an intermediate case 12. The transmission 3 comprises an input shaft 15, output shaft 16, a plurality of change-speed gears 17, and synchronizers 18. An output gear 19 engages with a ring gear 20 secured to a case 21 of the differential 4. The transfer device 5 comprises a gear 24 engaged with ring gear 20, bevel gear 26 on a shaft 25 of gear 24, and bevel gear 27 engaged with bevel gear 26.

Figure 2:
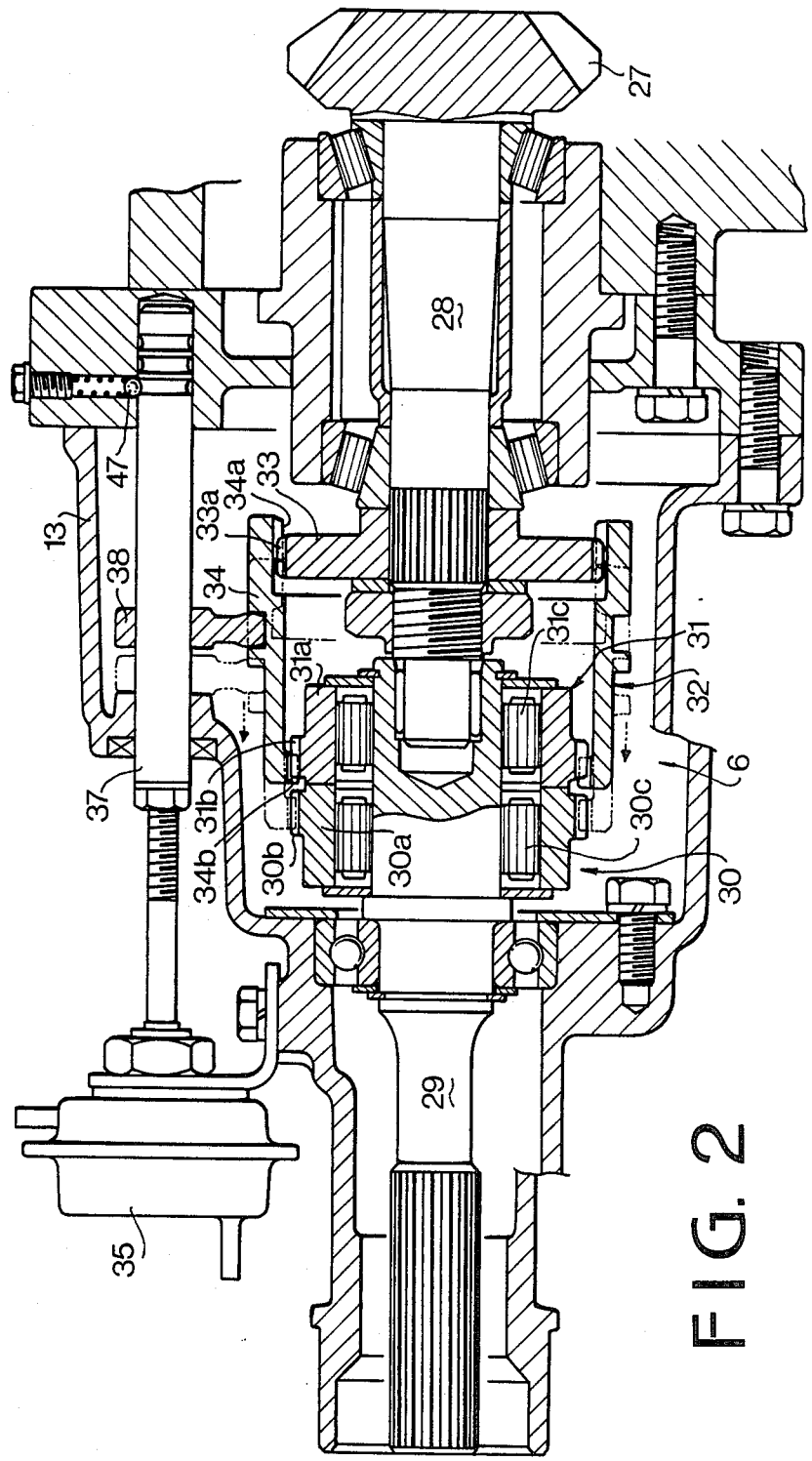
FIG. 2 is a sectional view of a main portion of the system.

Referring to FIG. 2, a transfer drive shaft 28 of the bevel gear 27 and a driven shaft 29 connected to the propeller shaft 7 are co-axially disposed, and both shafts 28 and 29 are coupled through the double overrunning clutch 6. The double overrunning clutch 6 comprises a forward overrunning clutch 30 and a reverse overrunning clutch 31 each of which is in the form of a freewheel. Clutches 30 and 31, comprise outer races 30a, 31a and rollers 30c, 31c disposed between the outer races 30a, 31b and the shaft 29, respectively. A forward/reverse selecting device 32 is provided comprising an axially slidable sleeve 34 with toothing. A gear 33 is secured to the shaft 28. The sleeve 34 has two inside toothings 34a and 34b. The toothing 34a is permanently engaged with a toothing 33a of the gear 33. Depending on the axial position of the sleeve 34. The toothing 34b is selectively engaged with a toothing 30b of the forward clutch 30 or with a toothing 31b of the reverse clutch 31, or simultaneously with both toothings 30b and 31b, the toothing 34b having such a width that it can engage with both toothings 30b and 31b at the same time. Such a selection of these different toothing engagements is performed by shifting the sleeve 34 to one of three axial positions, namely, a forward position, a reverse position and a lock position. The forward overrunning clutch 30 is so arranged as to transmit the rotation of the outer race 30a in the forward driving direction to the shaft 29 and as to allow the rotation of the shaft 29, in the forward driving direction, at higher speed than the outer race 30. The reverse overrunning clutch 31 is arranged oppositely. Namely, in the reverse driving direction, the rotation of the outer race 31a is transmitted to the shaft 29, and in the reverse driving direction to allow rotation of the shaft 29 at higher speed than the outer race 31b.

The sleeve 34 has an annular groove on the periphery thereof, in which a shifter fork 38 is relatively rotatably slidably engaged. The shifter fork 38 is operatively connected to a diaphragm 36 (FIG. 1) in a vacuum operated actuator 35 through a rod 37. A ball lock device 47 is provided to position the rod 37 at one of the three positions.

Figure 3:
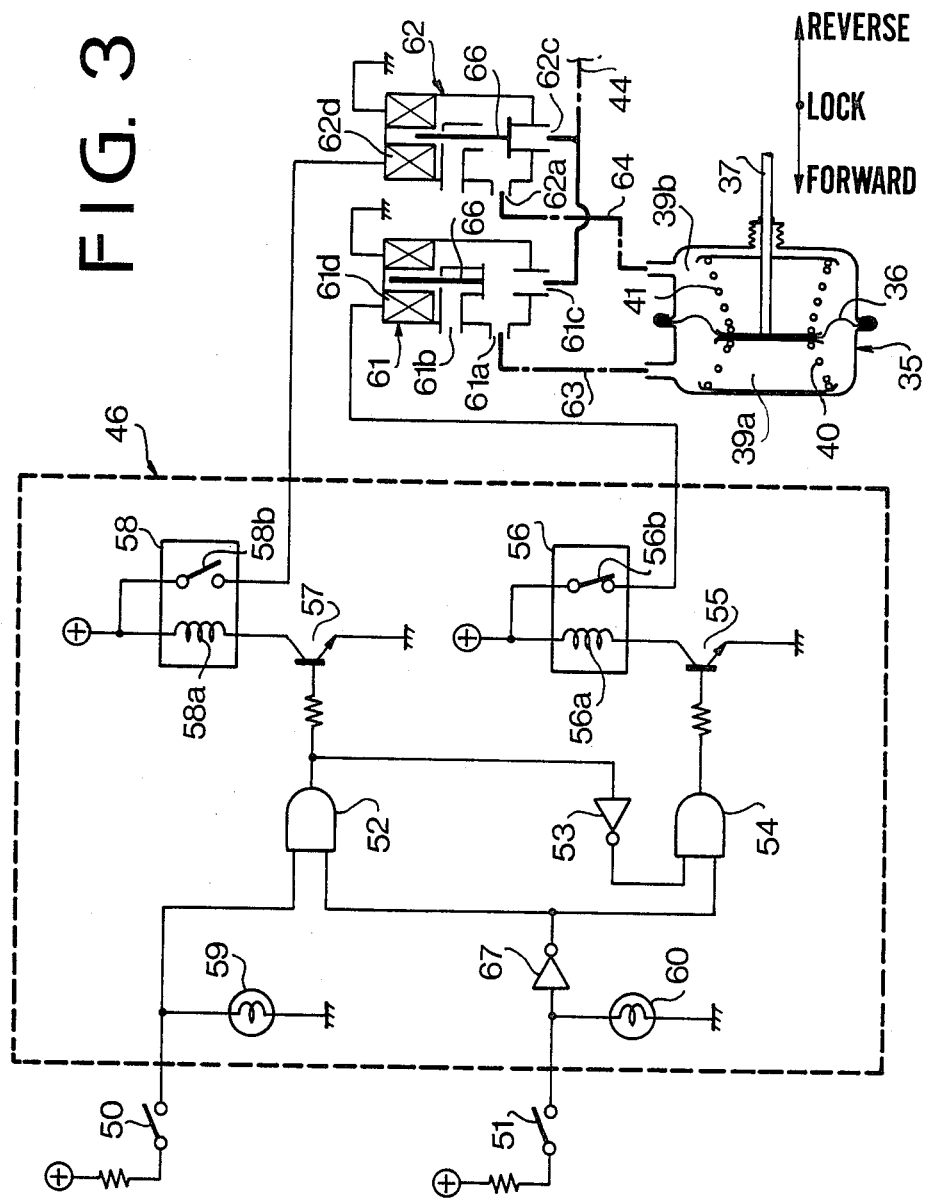
FIG. 3 is a circuit for operating an actuator for a double overrunning clutch.

As shown in FIGS. 1a and 3, the diaphragm 36 of the actuator 35 is held by springs 40 and 41 on both sides thereof to an intermediate lock position when both vacuum chambers 39a and 39b defined by the diaphragm are communicated with the atmosphere as described hereinafter. The vacuum chambers 39a and 39b are communciated with ports 61a and 62a of solenoid operated valves 61 and 62, respectively. The solenoid operated valves 61 and 62 have atmosphere ports 61b and 62b, vacuum ports 61c and 62c, and solenoids 61d and 62d respectively. Both vacuum ports 61c and 62c are communicated with an intake manifold 65 through a passage 44 having a check valve 45 so as to be supplied with vacuum pressure in the intake manifold 65. Each valves has a valves body 66 for selectively closing the atmosphere port or vacuum port in accordance with energization of the solenoid. When the solenoid is energized by the output of a control circuit 46, the valve body 66 closes the atmosphere port and opens the vacuum port to communicate the vacuum chamber of the actuator 35 with the intake manifold 65.

Referring to FIG. 3 showing the control circuit 46, there is provided a reverse switch 50 which is closed when a reverse gear in the transmission 3 is selected, and a lock switch 51 for locking the overrunning clutches 30 and 31. The reverse switch is connected to an AND gate 52 and the lock switch 51 is connected to AND gates 52 and 54 through an inverter 67. The output of the AND gate 52 is connected to a base of a transistor 57 and to the AND gate 54 through an inverter 53. The output of the AND gate 54 is connected to a base of a transistor 55. The transistor 57 is connected between a coil 58a of a relay 58 and the ground, and the transistor 55 is connected between a coil 56a of a relay 56 and the ground. A contact 58b of the relay 58 and a contact 56b of the relay 56 are connected to solenoids 62d and 61d, respectively.

In the state shown in FIG. 3, the output of the AND gate 52 is at a low level and the output of the AND gate 54 is at a high level, thereby turning on the transistor 55. Accordingly, the coil 56a of the relay 56 is excited to turn on the contact 56b, so that the solenoid 61d of the valve 61 is energized to open the vacuum port 61c. The vacuum chamber 39a of actuator 35 is communicated with the intake manifold 65 through passage 63, valve 61 and passage 44, and the diaphragm 36 is deflected to the left by the vacuum pressure in the intake manifold to draw the rod 37 to the left (forward position). Thus, the sleeve 34 is shifted to the left, so that the toothing 34b engages with the toothing 30b of the forward overrunning clutch 30. Accordingly, when the clutch 2 is engaged, the output of the change-speed transmission 3 is transmitted to the front wheels 10 through shaft 29, forward overrunning clutch 30, shaft 29 and propeller shaft 7. When the vehicle turns a corner, the front wheels 10 rotate faster than the rear wheels 23. That is, the shaft 29 rotates faster than the outer race 30a (in advance of it). However, the overrunning clutch 30 permits such a faster rotation of the shaft 29. Thus, the difference between the speeds of the front and rear wheels is absorbed in the clutch, and the vehicle turns the corner smoothly without the braking phenomenon.

When the transmission 3 is changed to the reverse driving state, the reverse switch 50 is closed. Accordingly, the output of AND gate 52 goes to a high level, the output of AND gate 54 goes to a low level, and a lamp 59 is turned on. Thus, the transistor 57 is turned on to close the contact 58b to energize the solenoid 62d. Accordingly, the vacuum chamber 39b is communicated with the intake manifold 65, shifting the rod 37 to the right (reverse position). Thus the reverse overrunning clutch 31 is selected in the same manner as described above but for the reverse driving. In reverse driving, the same operation as the forward driving is performed.

When the lock switch 51 is closed, a lamp 60 is lighted up and the outputs of AND gates 52 and 54 become low. Thus, transistors the 55, 57 become non-conductive, thereby de-energizing the solenoids 61d, 62d to communicate the vacuum chambers 39a, 39b with the atmosphere. The diaphragm 36 is located at the neutral position by springs 40, 41 to position the rod 37 at the lock position. Accordingly, the toothing 34b of the sleeve 34 engages both toothings 30b and 31b to lock the double overrunning clutch C. Thus, a direct connected four-wheel driving mode is established. Therefore, the vehicle is safely driven by four wheels without skidding of the wheels.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A power transmission system for a four-wheel drive vehicle having front and rear wheels and a transmission, the system comprising:
    a power transmitting system for transmitting the output of the transmission to the front and rear wheels;
    a forward overrunning clutch and a reverse overrunning clutch provided in said power transmitting system and when selected effective for forward drive and reverse drive respectively;
    means for selecting alternate ones of said overrunning clutches at a time for transmitting the output of the transmission through the selected one of said overrunning clutches, said selected one of said overrunning clutches at the time being arranged so as to permit overrunning of said selected overrunning clutch; and
    said means further for selecting and locking together both said forward and reverse overrunning clutches for transmitting the output of the transmission through one of said clutches and such that the other of said clutches makes overrunning of said one of said clutches impossible.

2. The power transmission system according to claim 1, wherein
    each of the forward and reverse overrunning clutches comprises an outer race selectively operatively connected via said means to a drive shaft of said power transmitting system, the drive shaft being connected from the transmission, and rollers operatively connected to the outer race and the rollers of both clutches being connected to a same driven shaft of said power transmitting system, the driven shaft being connected to said front wheels, said drive and driven shafts being in said power transmitting system between said front and rear wheels.

3. The power transmission system according to claim 2, wherein
said means comprises a sleeve connected to the drive shaft and axially displaceable into three respective positions for selecting alternate ones of said overrunning clutches at a time and for selecting and locking together both said clutches, respectively by connection of said sleeve to corresponding of said outer races, and a vacuum operated actuator having a diaphragm, a rod connected to the diaphragm and the sleeve, solenoid operated valves for selectively supplying vacuum pressure to the actuator, and an electric circuit for operating said solenoid operated valves in dependency on a selected position so as to shift the rod corresponding to one of the three positions.

4. The power transmission system according to claim 1, wherein
said power transmitting system includes a portion between the front wheels and the rear wheels of the vehicle, said portion including a driven shaft connected to one of the front wheels and the rear wheels of the vehicle and a drive shaft connected to the transmission.
each said overrunning clutch having a first member and a second member, said first member being operatively connected to said second member so as to be rotated by said second member in a first direction, and rotatable in said first direction faster than the speed at which said second member rotates said first member, said first direction of said first and second clutches being opposite rotatable directions,
said first members being connected to said one of said shafts, and
said means is for selectively engaging said second members with the other of said shafts, together and individually respectively, said clutches being arranged such that when said second members are engaged together with said other shaft, said first member of respective of the clutches is prevented from being rotatable in said first direction faster than the speed at which said second member rotates said first member.

5. The power transmitting system according to claim 1, further comprising
first switch means operatively connected to said means for automatically selecting said forward and reverse overrunning clutches upon occurrence of forward and reverse transmission ranges, respectively, of the transmission, and
second switch means operatively connected to said means for initiating the selecting and locking of both said overrunning clutches.

6. A power transmission system for a four-wheel drive vehicle having a change-speed transmission having a forward transmission range and a reverse transmission range, the system further having first and second power transmission systems for transmitting output of the change-speed transmission respectively to front and rear wheels of the vehicle, and a drive shaft and a driven shaft in one of said first and second power transmission systems, and the drive shaft being connected to the output of the transmission, the system comprising;

first means comprising a forward overrunning clutch and second means comprising a reverse overrunning clutch selectively coupling said drive and driven shafts,
the first means comprising said forward overrunning clutch for permitting rotation of the front wheels faster than the rear wheels during forward driving in said forward transmission range when said forward overrunning clutch alone is selected for coupling said drive shaft to said driven shaft,
each of the forward and reverse overrunning clutches comprising an outer race and rollers couplingly disposed between the outer race and the driven shaft,
first toothing provided on a periphery of the drive shaft,
selector means for selecting said clutches for coupling said drive and driven shafts, said selector means comprising an axially displaceable sleeve having an inside second toothing rotatably engaged with the first toothing in axially displaced positions of the sleeve,
the sleeve having an inside third toothing,
fourth and fifth toothings provided on peripheries of the outer races of the forward and reverse overrunning clutches, respectively,
the third toothing being so arranged as to selectively rotatably engage individually with one of the fourth and fifth toothings, respectively, and to rotatably engage simultaneously with both the fourth and fifth toothings, respectively in three respective axial positions of the sleeve, and
the second means comprising said reverse overrunning clutch for permitting rotation of the front wheels faster than the rear wheels during reverse driving in said reverse transmission range when said reverse overrunning clutch alone is selected for coupling said drive shaft to said driven shaft.

7. The power transmission system according to claim 6, wherein
the selector means further comprises shifting means for shifting the sleeve to a forward axial position and a reverse axial position in dependency on the selection for said coupling of the forward overrunning clutch and the reverse overrunning clutch, respectively, and for shifting the sleeve to an intermediate axial position for the coupling of both of said clutches simultaneously.

8. The power transmission system according to claim 7 wherein the shifting means comprises a vacuum operated actuator having a diaphragm, a rod connected to the diaphragm and the sleeve, solenoid operated valves for selectively supplying vacuum pressure to the actuator, and an electric circuit for operating said solenoid operated valves in dependency on a selected position so as to shift the rod corresponding to one of the three positions.

9. A power transmission system for a four-wheel drive vehicle having front and rear wheels and a transmission, the system comprising:
a power transmisting system for transmitting the output of the transmission to the front and rear wheels;
means, comprising a forward overrunning clutch and a reverse overrunning clutch each clutch being couplable into the power transmitting system between the front and rear wheels and arranged, and when either one of said clutches alone is individually coupled into the power transmitting system, for transmitting the output of the transmission through the coupled of said forward overrunning clutch and said reverse overrunning clutch, respectively, in a forward driving direction and a reverse driving direction, respectively, and permitting the front wheels to turn faster than the rear wheels by overrunning of the coupled clutch;

coupling means for individually coupling respective of said clutches alone into the power transmitting system, and for coupling both of said clutches simultaneously into the power transmitting system, respectively;

said clutches are arranged such that when both clutches are simultaneously coupled into the power transmitting system they prevent the front wheels from running faster than the rear wheels and transmit the output of the transmission in the forward driving direction and reverse driving direction respectively.

10. The power transmitting system according to claim 9, further comprising first switch means operatively connected to said coupling means for individually coupling said forward and reverse overrunning clutches upon occurrence of forward and reverse transmission ranges, respectively, of the transmission, and second switch means operatively connected to said coupling means for initiating the simultaneous coupling of both said overrunning clutches.

11. The power transmitting system according to claim 9, wherein said power transmitting system including a driven shaft connected to one of the front wheels and the rear wheels of the vehicle and a drive shaft connected to the transmission, each said overrunning clutch having a first member and a second member, said first member being operatively connected to said second member so as to be rotated by said second member in a first direction, said rotatable in said first direction faster than the speed at which said second member rotates said first member, said first direction of said first and second clutches being opposite rotatable directions, said first members being connected to said one of said shafts, and said coupling means is for selectively engaging said second members with the other of said shafts, together and individually respectively, said clutches being arranged such that when said second members are engaged together with said other shaft, said first member of respective of the clutches is prevented from being rotatable in said first direction faster than the speed at which said second member rotates said first member.

* * * * *